(12) United States Patent
Ban

(10) Patent No.: US 10,268,344 B2
(45) Date of Patent: *Apr. 23, 2019

(54) METHOD AND SYSTEM FOR PROVIDING A CONTENT BASED ON PREFERENCES

(71) Applicant: Samsung Electronics Co., Ltd., Gyeonggi-do (KR)

(72) Inventor: Ji Hye Ban, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 529 days.

This patent is subject to a terminal disclaimer.

(21) Appl. No.: 15/046,972

(22) Filed: Feb. 18, 2016

(65) Prior Publication Data

US 2016/0162135 A1 Jun. 9, 2016

Related U.S. Application Data

(63) Continuation of application No. 13/315,410, filed on Dec. 9, 2011, now Pat. No. 9,288,279.

(30) Foreign Application Priority Data

Dec. 9, 2010 (KR) ........................ 10-2010-0125317

(51) Int. Cl.
*G06F 15/16* (2006.01)
*G06F 3/0482* (2013.01)
(Continued)

(52) U.S. Cl.
CPC ........ *G06F 3/0482* (2013.01); *G06F 3/04842* (2013.01); *G06F 17/30029* (2013.01);
(Continued)

(58) Field of Classification Search
CPC .......... G06F 17/30029; H04L 12/2812; H04L 67/289; H04L 67/306; H04L 67/2819
(Continued)

(56) References Cited

U.S. PATENT DOCUMENTS 6,493,720 B1 * 12/2002 Chu .................. G06F 17/30353
8,094,947 B2 * 1/2012 Marchesotti ......... G06K 9/4671
382/173

(Continued)

FOREIGN PATENT DOCUMENTS

KR        10-0837695 B1       6/2008
KR    10-2010-0089841 A       8/2010
(Continued)

OTHER PUBLICATIONS

Korean Search Report dated Jul. 7, 2016.
Korean Search Report dated Apr. 26, 2017.

*Primary Examiner* — Anthony Mejia
(74) *Attorney, Agent, or Firm* — Cha & Reiter, LLC

(57) ABSTRACT

A method for providing a content based on a user's preference(s) includes analyzing meta-data information of a pre-stored content, determining at least one preference based on the analyzed meta-data information, transmitting the at least one preference to a content-providing server; searching, at the content-providing server, for at least one content corresponding to the at least one preference, extracting general information of at least one content found to correspond to the at least one preference and transmit the general information to the portable terminal.

17 Claims, 5 Drawing Sheets

(51) Int. Cl.
  *G06F 17/30* (2006.01)
  *H04L 12/28* (2006.01)
  *H04L 29/08* (2006.01)
  *G06F 3/0484* (2013.01)
  *H04M 1/725* (2006.01)

(52) U.S. Cl.
  CPC .. *G06F 17/30528* (2013.01); *G06F 17/30598* (2013.01); *H04L 12/2812* (2013.01); *H04L 67/10* (2013.01); *H04L 67/26* (2013.01); *H04L 67/289* (2013.01); *H04L 67/2819* (2013.01); *H04L 67/306* (2013.01); *H04M 1/72522* (2013.01)

(58) Field of Classification Search
  USPC .................................................. 709/200, 203
  See application file for complete search history.

(56) References Cited

U.S. PATENT DOCUMENTS

| | | | | |
|---|---|---|---|---|
| 8,307,289 B2* | 11/2012 | Shah | | G06F 9/44505 702/119 |
| 8,312,055 B2* | 11/2012 | Arreola | | H04N 21/47214 707/802 |
| 8,347,213 B2* | 1/2013 | Clifton | | G06F 17/30017 715/716 |
| 8,694,666 B2* | 4/2014 | Dixon | | G06F 17/30035 709/219 |
| 2003/0065778 A1 | 4/2003 | Malik | | G06Q 10/107 709/225 |
| 2005/0060741 A1* | 3/2005 | Tsutsui | | H04N 5/445 725/32 |
| 2007/0048714 A1* | 3/2007 | Plastina | | G06F 17/30775 434/308 |
| 2007/0288470 A1* | 12/2007 | Kauniskangas | | H04L 12/2809 |
| 2007/0300309 A1* | 12/2007 | Naito | | G06F 21/10 726/27 |
| 2008/0040359 A1* | 2/2008 | Arrouye | | G06F 17/30067 |
| 2008/0092168 A1* | 4/2008 | Logan | | G06F 17/30265 725/44 |
| 2008/0109405 A1* | 5/2008 | Tedesco | | G06F 17/30244 |
| 2008/0154962 A1* | 6/2008 | Yu | | G06F 17/3028 |
| 2008/0195660 A1* | 8/2008 | Tedesco | | H04H 20/93 |
| 2009/0055436 A1* | 2/2009 | Ayeni | | G06Q 30/02 |
| 2009/0163183 A1 | 6/2009 | O'Donoghue et al. | | |
| 2009/0187936 A1* | 7/2009 | Parekh | | H04H 20/38 725/25 |
| 2009/0198732 A1* | 8/2009 | Ross | | G06F 17/30011 |
| 2009/0276809 A1* | 11/2009 | Choi | | G06F 17/30781 725/61 |
| 2009/0307626 A1* | 12/2009 | Jalon | | G06F 3/0481 715/771 |
| 2010/0031366 A1* | 2/2010 | Knight | | G06Q 10/10 726/26 |
| 2010/0106790 A1* | 4/2010 | Shenfield | | G06F 17/3089 709/206 |
| 2010/0115025 A1* | 5/2010 | Maegawa | | H04N 1/00344 709/203 |
| 2010/0205037 A1* | 8/2010 | Besehanic | | G06Q 30/02 705/7.34 |
| 2010/0281152 A1* | 11/2010 | Istavan | | H04N 21/2355 709/223 |
| 2011/0029553 A1* | 2/2011 | Bogart | | G06F 17/30265 707/769 |
| 2011/0099181 A1* | 4/2011 | Aminian | | G06F 17/30038 707/754 |
| 2011/0225178 A1* | 9/2011 | Ingrassia | | G06F 17/30038 707/769 |
| 2012/0016879 A1* | 1/2012 | Groux | | G06F 17/30265 707/737 |
| 2012/0023204 A1* | 1/2012 | Takemura | | G06F 17/30038 709/219 |
| 2012/0136658 A1* | 5/2012 | Shrum, Jr. | | G10L 17/00 704/231 |
| 2012/0179717 A1* | 7/2012 | Kennedy | | G06F 17/30867 707/772 |
| 2013/0046582 A1* | 2/2013 | Ramer | | G06Q 10/101 705/7.32 |
| 2013/0094590 A1* | 4/2013 | Laksono | | H04N 19/44 375/240.25 |
| 2013/0268475 A1* | 10/2013 | Kobayashi | | G06N 5/02 706/46 |

FOREIGN PATENT DOCUMENTS

KR   10-2010-0104299 A   9/2010
KR   10-2010-0104649 A   9/2010

* cited by examiner

METHOD AND SYSTEM FOR PROVIDING A CONTENT BASED ON PREFERENCES

CROSS REFERENCE TO RELATED APPLICATIONS

This is a Continuation application of U.S. patent application Ser. No. 13/315,410 filed on Dec. 9, 2011 which claims, pursuant to 35 USC 119, priority to, and the benefit of the earlier filing date of, that patent application entitled "Method and System for Providing a Content Based on Preference," filed on Dec. 9, 2010 in the Korean Intellectual Property Office, and afforded Serial No. 10-2010-0125317, the contents of which are incorporated by reference, herein.

BACKGROUND

1. Field of the Invention

The present invention relates to the field of content presentation in portable terminals, and more specifically to a method and a system for providing content based on a user's preference.

2. Description of the Related Art

With the significant development of information, communication and semiconductor technologies and their contribution to the supply of portable terminals, the use of portable terminals has rapidly increased. In particular, currently available portable terminals have developed to a mobile convergence stage that includes not only their traditional field of verbal communications, but to other fields, such a data communication and multi-media presentation. As a representative example of the currently available portable terminals, a typical portable (mobile) terminal provides various functions; a TV watching function (e.g., mobile broadcasting) through a broadcasting system such as Digital Multimedia Broadcasting (DMB) or Digital Video Broadcasting (DVB)), a music playing function (e.g., MPEG Audio Layer-3 (MP3)), a photographing function (e.g., still and motion pictures), and a data communication function as well as general communication functions such as a voice call and a message transmission/reception. Likewise, as a portable terminal supports many different and various types of functions, a user can use, view or interact with various content through the portable terminal.

Meanwhile, in order for a user of a portable terminal to use, view or interact with a content (e.g., a game, a music file, a moving picture file an e-book), a user typically burst connect to a content-providing server and download a corresponding content. In case a user connects to a content-providing server and downloads a content that the user prefers, the user must first directly connect to the content-providing server, search for a preferred content, and then request downloading of the preferred content. However, as the amount of content becomes ever increasingly larger, the user may be inconvenienced in searching for content that the user prefers. Particularly, in the case when the user does not know an exact name of a content (e.g., the title of a book, the title of a song, the title of a video, etc.), the search becomes even more inconvenient. Further, the user must frequently connect to the content-providing server in order to check whether a new content has been registered that may be of interest to the user.

As described above, according to a conventional art, the user must connect to a content-providing server and search for a content every time a user desires to download a preferred contents or check whether a new content has been registered. This continuous contacting of the content-providing server is time consuming and over extended periods of time becomes an inconvenience on the user in both time and effort.

SUMMARY

The present invention has been made in view of the above problems, and provides a method and a system for providing a content based on a user preference, wherein a user's preference(s) is determined through an analysis of meta-data information of a content that is stored in a portable terminal, the result of the analysis is transmitted to a content-providing server, and the user may then be provided information from the contents-providing server of content that the user may be interested in or prefers.

In accordance with an aspect of the present invention, a method for providing a content based on at least one preference of a user operating a portable terminal, the method comprising the steps of analyzing meta-data information associated with content stored on the portable terminal, determining at least one preference based on the analyzed meta-data information, transmitting the determined at least one preference to a content-providing server, searching for at least one content corresponding to the at least one preference received by the content-providing server, extracting general information of at least one content found to be corresponding to the at least one preference and transmitting the general information of the at least one content found corresponding to the at least one preference to the portable terminal.

In accordance with another aspect of the present invention, a system for providing content based on at least one preference is disclosed. The system comprises a portable terminal for analyzing meta-data information of pre-stored content, determining at least one preference from the analyzed meta-data information and transmitting the determined at least one preference; and a contents-providing server for: receiving the transmitted at least one preference, searching for at least one content corresponding to the at least one preference, extracting general information of the searched content determined to correspond to the at least one preference and transmitting the extracted general information to the portable terminal.

In another aspect of the invention, a portable terminal comprises a processor in communication with a memory, the memory including code which when accessed by the processor causes the processor to, determine at least one user preference based on meta-data information associated with content available to the portable terminal, transmit the at least one preference over a network connection, receive general information associated with each of at least one content matching the at least one user preference, display the received general information and a function menu, and execute a function associated with one of the received general information in response to a selection of a corresponding function within the function menu.

As illustrated above, a method and a system for providing a content based on at least one of a user's preference according to an exemplary embodiment of the present invention can provide a preferred (i.e., desired or highly interesting) content corresponding to the user's preference to the user at regular intervals, or in a pushing method when a new content is registered, through which the user can easily obtain general information regarding the preferred content without connecting to a content-providing server. In addition, the user may be able to easily download (purchase) the preferred contents, without the burden of performing additional steps. Therefore, the present invention provides for improvement in the user's interaction with the content-providing server so that the interaction is much more convenient to the user.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
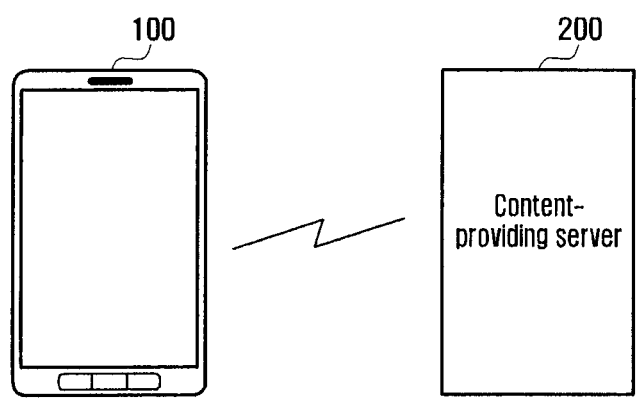
FIG. 1 illustrates a system for providing content based on preference according to an exemplary embodiment of the present invention.

FIG. 1 illustrates a system for providing a content based on a user's preference(s) (i.e., at least one preference) according to an exemplary embodiment of the present invention.

Referring to FIG. 1, a system for providing a content based on preference 1000 according to an exemplary embodiment can include at least a portable terminal 100 and a content-providing server 200. As would be appreciated, the portable terminal 100 and the content-providing server 200 may be in communication over one or more networks (not shown). For example, the portable terminal 100 and server 200 may be in communication through a cellular network (as implied by the illustrated z-shape carrier wave) and communication is performed over this network. Alternatively, terminal 100 and server 200 may be in communication via a wireless data communication network (e.g., WIFI, 3G, 4G) or a wired communication network (e.g., internet). In addition, the terminal 100 and server 200 may be in communication through multiple networks, wherein a request from the terminal 100 may be performed over a cellular network, for example, and the requested (i.e., preferred) content may be provided to the terminal over a different network (e.g., the internet).

In addition, the requested content need not be provided immediately upon receiving the request. Rather the user and/or content-server may provide instruction that the download of the preferred content may occur after a certain time or when the terminal is connected to a particular network. In this way, the terminal is not busy during the download process and does not interfere with the user's ability to use the terminal during the download process. Alternatively, the download may occur when there are periods of low activity of the terminal or of lower transmission costs. In another alternative aspect, the download may occur in parts so that the user may be able to use the terminal during periods when downloading is not being performed. In addition, downloading in parts may be advantageous as it enables the user to view those parts that have been downloaded (either in real-time or which were previously stored) when the user cannot afford the time to view the whole content (or have to wait for the whole content to download).

The portable terminal 100 can store at least one content. The content may for example be a music file, a moving picture file, a game, and/or an e-book, etc. However, other types of content are also suitable for the processing shown herein. The portable terminal 100 can download a content using wired or wireless communication and store the downloaded content. Particularly, the portable terminal 100 according to the present invention can analyze meta-data information of previously or currently stored content to determine user's preference(s), and transmit the user's preference to the content-providing server 200. Thereafter, the portable terminal 100 can receive general information on a content corresponding to the user's preference (hereinafter, called "preferred content") from the content-providing server 200, and store the received general information. The general information may include meta-data information of the content, link information including a review page link for checking review information and a purchase page link, and image information of the content (e.g., the cover image of an e-book).

After being informed of a preferred content that is comparable to the user's preference(s), a user may request viewing the information associated with the preferred content. In this case, the portable terminal 100 can display the preferred content on a display unit using image information included in the general information. At this time, if any one of the displayed images is selected, the portable terminal 100 can display a menu pop-up window. The menu pop-up window may include additional menus, such as a purchasing menu, a deleting menu, a review-viewing menu and/or a detailed-information-viewing menu, etc. In case a purchasing menu is selected from the menu pop-up window, the portable terminal 100 may display a purchase page for the purchase of the preferred content associated with the provided general information. Alternatively, in the case a review-viewing menu is selected from the menu pop-up window, the portable terminal 100 can display a review page including another user's review information regarding the preferred content. Alternatively, in the case a detailed-information-viewing menu is selected from the menu pop-up window, the portable terminal 100 can display detailed information of the preferred content. Alternatively, in case a delete or deleting menu is selected from the menu pop-up window, the portable terminal 100 can delete the general information of the corresponding preferred content, update user's preference, and transmit the updated user's preference to the contents-providing server 200.

As would be appreciated, the general information provided by the content-providing server may include sufficient information to satisfy the user's selection from the pop-up menu. However, if would be understood that the information may include information to a link that provides the requested information. For example, if the review page is selected and there are a significant number of reviews regarding the associated content, then rather that the provided general information including each review, the provided information may include a link to a review page in which the reviews are then downloaded and presented to the user. However, if there is only one review, then the single review may be downloaded with the provided general information. Thus, the amount of general information regarding the preferred content may be adjusted to balance the time required for downloading the general information and the user's desire for the requested content. This balancing may be performed by the user or by the content-providing server. For example, the general information may provide a list of reviews or a link to a plurality of reviews if the number of reviews or the amount of memory used exceeds a predetermined limit. The user may then request that one or more of the reviews be provided after reviewing the number of reviews.

The content-providing server 200 may also be a server where a user can purchase the preferred content.

It would be understood that the content-providing server 200, shown is FIG. 1, may represent both a physical and logical server. That is server 200 may represent multiple servers that perform the tasks described herein and are referred to generally as "a content-providing server." For example, the content-providing server 200, illustrated in FIG. 1, may be a server that physically includes the content requested by the user or may be a server that has access to other servers (not shown) that contain content that is requested by the user. The other servers may be set up to include specialized content in that the server provides only certain types of content. The requested content after appropriate payment which may be managed by yet another server (not shown) may then be provided by the content-providing server 200 over one or more networks, as previously discussed.

Particularly, the content-providing server 200 according to an exemplary embodiment of the present invention can receive a user's preference(s) transmitted from the portable terminal 100. The content-providing server 200 can store the received user's preference(s) in the form of a database. Thereafter, the content-providing server 200 can search for a content corresponding to user's preference (i.e., a preferred content), extract general information of the searched preferred content, and transmit the extracted general information to the portable terminal 100. The contents-providing server 200 can search for a preferred content during preset periods (e.g., hour, day week, etc.), and transmit general information of the preferred content found to be comparable to the user's preference(s) to the portable terminal 100 at one or more rates (e.g., once per hour, once per day, etc.). Alternatively, the content-providing server 200 can check whether a new content corresponds (i.e., is comparable) to the user's preference(s) when new content is registered (on the illustrated content-providing server 200 or one or more servers (not shown) that may be accessed by the illustrated content-providing server 200), and transmit general information regarding the new content to the portable terminal 100 if the new content corresponds to the user's preference. In this case, the content-providing server 200 can transmit general information of the preferred contents in a pushing method (i.e., automatically, without a specific request from the user). Pushing technology is well known in the art and the principles of pushing technology need not be presented herein in order to understand the operating principles of the present invention.

Figure 2:
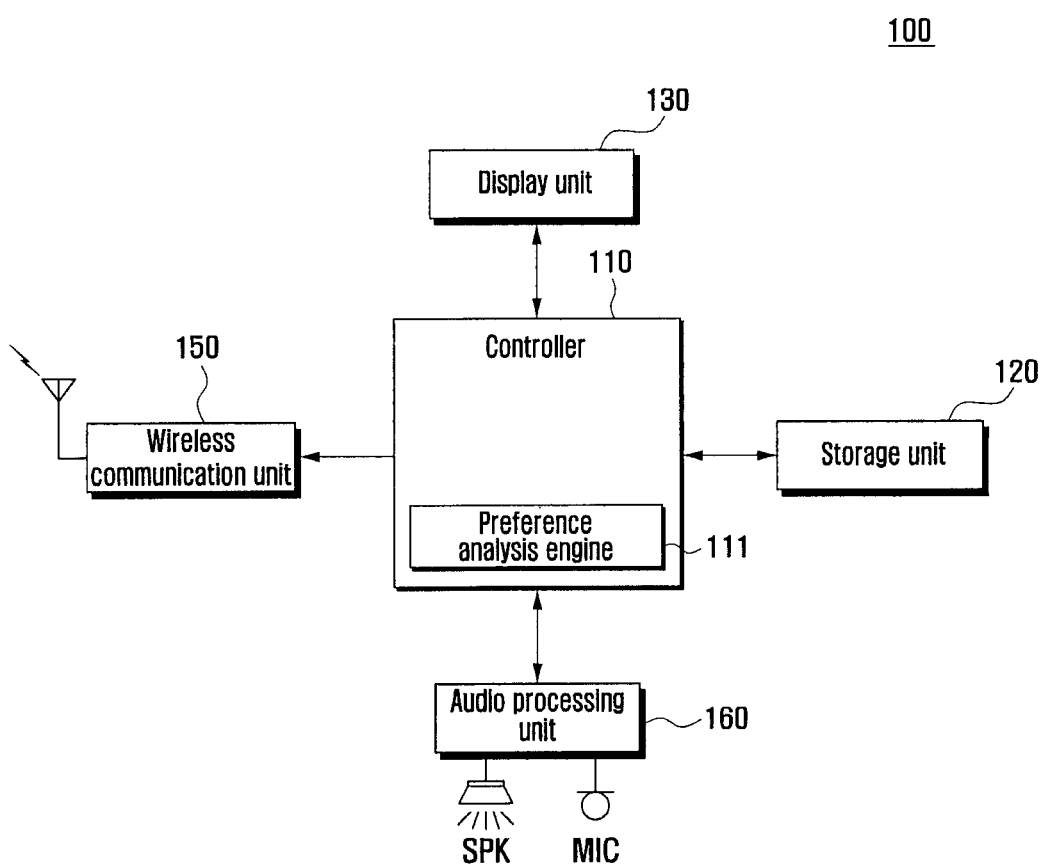
FIG. 2 is a block diagram illustrating a configuration of a portable terminal according to an exemplary embodiment of the present invention.

FIG. 2 illustrates a configuration of a portable terminal 100 according to an exemplary embodiment of the present invention.

Referring to FIG. 2, a portable terminal 100 may include a controller 110, a storage unit 120, a display unit 130, a wireless communication unit 150 and an audio-processing unit 160. The controller 110 may include a preference analysis engine 111. Although not shown the portable terminal 100 may also include a connection to a wired network. For example, many power cables for portable terminals are USB (Universal Serial Bus) capable and, thus, the portable terminals may be charged from a computer system. The USB connection also allows the controller or computer system to download data and or information to the memory of the portable terminal 100. Hence, while FIG. 2 illustrates a wireless communication link, it would be understood that the typical portable terminal may include an inherent wired-link capability and such capability is not shown in the drawings as it is not necessary for the understanding of the principles of the invention.

The wireless communication unit 150 can form a communication channel for a call with a base station (including a voice call and a video call) and a data communication channel for data transmission with the base station. For example, the wireless communication unit 150 can transmit a voice signal and/or a video signal to another terminal under the control of a controller 110, or receive a voice signal and/or a video signal from another terminal. As would be appreciated, the terminals need not be the same type of terminals. For example, each terminal need not be cellular telephone but rather may be combinations of devices that use the same type of communication medium. For example, one terminal may be a smartphone (e.g., Samsung Fascinate cellular telephone) while the other terminal may be tablet personal computer that includes a voice or data calling feature (e.g., Samsung Galaxy Tab). Samsung, Samsung Fascinate, Samsung Galaxy Tab are registered Trademarks of the Samsung Electronics Co., Ltd. a corporation of the Republic of Korea.

Wireless communication unit 150 may include a wireless frequency transmission unit (not shown) that up-converts the frequency of a signal to be transmitted and amplifies the to-be-transmitted up-converted signal, a wireless frequency reception unit (not shown) that low-noise-amplifies a received signal and down-converts the frequency of the received signal, and a transmission-and-reception separation unit (not shown) that separates a received signal and a transmitted signal, etc. Particularly, the wireless communication unit 150 can transmit a user's preference(s) to a content-providing server 200 through an antenna. The wireless communication unit 150 can also receive general information of a preferred content corresponding to the user's preference(s) from the content-providing server 200 through the antenna. The wireless communication unit 150 can receive content in response to the successful authorization of a purchasing request. Further, the wireless communication unit 150 can transmit updated user's preference(s) to the content-providing server 200. For example, a user's preference(s) may be changed (or updated) by the user inputting new preference criteria or when the user performs an action upon received general information. For example, if a user elects to delete received general information, under the control of the controller 110, then the user's preference(s) may be updated and this updated information is provided to the content-providing server 200. As previously discussed, the communication links associated with the portable terminal are not limited to the conventional cellular network and rather the illustrated wireless communication unit 150 can be substituted for or include units that provide for a wireless Internet module, such as Wireless LAN (WLAN), Wi-Fi, Wibro and Wimax, or other types of communication modules.

The display unit 130 displays information inputted by a user or information to be displayed to a user including various menus of a portable terminal 100. For example, the display unit 130 can provide various screens according to the use of the portable terminal 100, such as an idle screen, a message-writing screen, a calling screen, etc. Particularly, the display unit 130, according to the present invention, can display an indicator that informs the user of the reception of general information of a preferred content, upon receipt of the general information or at preset intervals (e.g., once/hour). Further, the display unit 130 can display a preferred content using image information included in general information of the preferred content which is received (through the wireless communication unit 150, for example). If any one of the displayed images (when multiple preferred content are available to the user) is selected, the display unit 130 can output a menu pop-up window. The menu pop-up window may include a purchasing menu for the purchasing of content corresponding to the selected image, a deleting menu, a detailed-information-viewing menu, and a review-viewing menu. Such a display unit 130 may be formed as a Liquid Crystal Display (LCD), an Organic Light Emitted Diode (OLED), an Active Matrix Organic Light Emitted Diode (AMOLED), etc. In case the display unit 130 is in the form of a touch screen, the display unit 130 can be operated as an input unit (not shown). Alternatively, a keyboard unit (not shown) may be used to provide the user inputs to controller 110.

The audio-processing unit 160 can transmit an audio signal to a speaker (SPK), or transmit an audio signal inputted from a microphone (MIC) to the controller 110. The audio-processing unit 160 converts an analog voice signal inputted from the microphone (MIC) into a digital voice signal and transmit the converted voice signal to the controller 110, or converts a digital voice signal into an analog voice signal and outputs the converted voice signal through the speaker (SPK). For example, the audio-processing unit 160 can output a key-input sound stored in advance in the storage unit 120, an effect sound according to execution of a function, a replay sound of a music file (e.g., an MP3 file), etc. Particularly, the audio-processing unit 160 according to the present invention can output an effect sound that informs the user of the reception of general information of at least one preferred content.

The storage unit 120 can store user data, etc. as well as programs that are necessary in operating functions according to an exemplary embodiment of the present invention. For example, the storage unit 120 can store a program (in a program data area, not shown) that controls general operation of portable terminal 100, an operating system (OS) that boots portable terminal 100, an application program that is necessary for replaying a multimedia content, and an application program that is necessary for other options of portable terminal 100, (e.g., a camera function, a sound-replaying function, an image or video replaying function, and a near field communication function, etc.). Further, storage unit 120 may store data, (in a data storage area, not shown) that is generated according to the use of portable terminal 100. For example, data such as a phone book, a photographed image, and a downloaded contents, etc., may be stored in the data area. The data area may further be divided into areas of permanent memory (e.g., flash) or dynamic memory (RAM), wherein phone book entries, photographed images and/or downloaded content may be stored in the permanent memory and variable, non-persistent, data may be stored in the RAM. Particularly, a storage unit 120 according to the present invention can collect meta-data information of previously and/or currently stored content and store a program that determines the user's preference(s) based on an analysis of the content (and/or user-inputted information). Further, the storage unit 120 can store general information of a preferred content corresponding to user's preference that is received through a wireless communication unit 150. The analysis program may also employ the user's actions on the received general information to update the user's preference(s).

The control unit 110 can control general operation of a portable terminal 100 and signal flow between the illustrated internal blocks of a portable terminal 100. Particularly, the control unit 110 according to the present invention can collect meta-data information of stored content according to user's request, analyze the meta-data information to determine user preference(s), and transmit the determined preference(s) to the content-providing server 200 through the wireless communication unit 150. To this end, the controller 110 may include a preference analysis engine 111.

The preference analysis engine 111 can collect meta-data information of previously and/or currently stored content or collect meta-data information of contents that is downloaded for a predetermined period of time. The preference analysis engine 111 may then set a portion of meta-data information of the content, such as Author, Category, etc. as the user's preference(s). For example, when the user downloads content of author "A" most, and downloads e-books of literature category most, "author A" and "literature" can be set as the user's preference(s). Such a preference analysis can be performed according to a user's request or based on a preference update period (e.g., once/week).

The controller 110 can receive general information of a preferred content corresponding to the user's preference(s) from content-providing server 200, and store the received general information to the storage unit 120. Further, the controller 110 can display general information regarding at least one preferred content on a display unit 130. The general information may include using image information the at least one preferred content, display a menu pop-up window if one of displayed images is selected, and perform a function corresponding to a menu entry selected from the menu pop-up window. For example, the controller 110 can control the display unit 130 to display a purchasing page corresponding to the selection of the purchase page from the pop-up menu. Alternatively, the controller 110 can cause the display unit to display a detailed information page or a review page corresponding to a detailed-information-viewing request or a review-viewing request. Alternatively, the controller 110 can delete the general information of a content corresponding in response to a selection of a delete or "deleting request. The controller 110 can also update the user's preference(s) and transmit the updated user's preference(s) to a content-providing server 200.

Though not illustrated in FIG. 2, a portable terminal 100 according to the present invention may further selectively include elements for providing additional functions that are known in the art. For example, a camera module for photographing an image or a video, a broadcast reception module for receiving a broadcast, a digital sound source replay module for playing audio in an MP3 format, a near field communication module for near field communication, and a proximity sensor module for close sensing, etc., may also be incorporated into the portable terminal 100. It is not possible to list all such elements because the elements are modified according to the convergence trend of digital devices, but the portable terminal 100 according to the present invention may further include elements of the same level as that of the above-mentioned elements.

Figure 3:
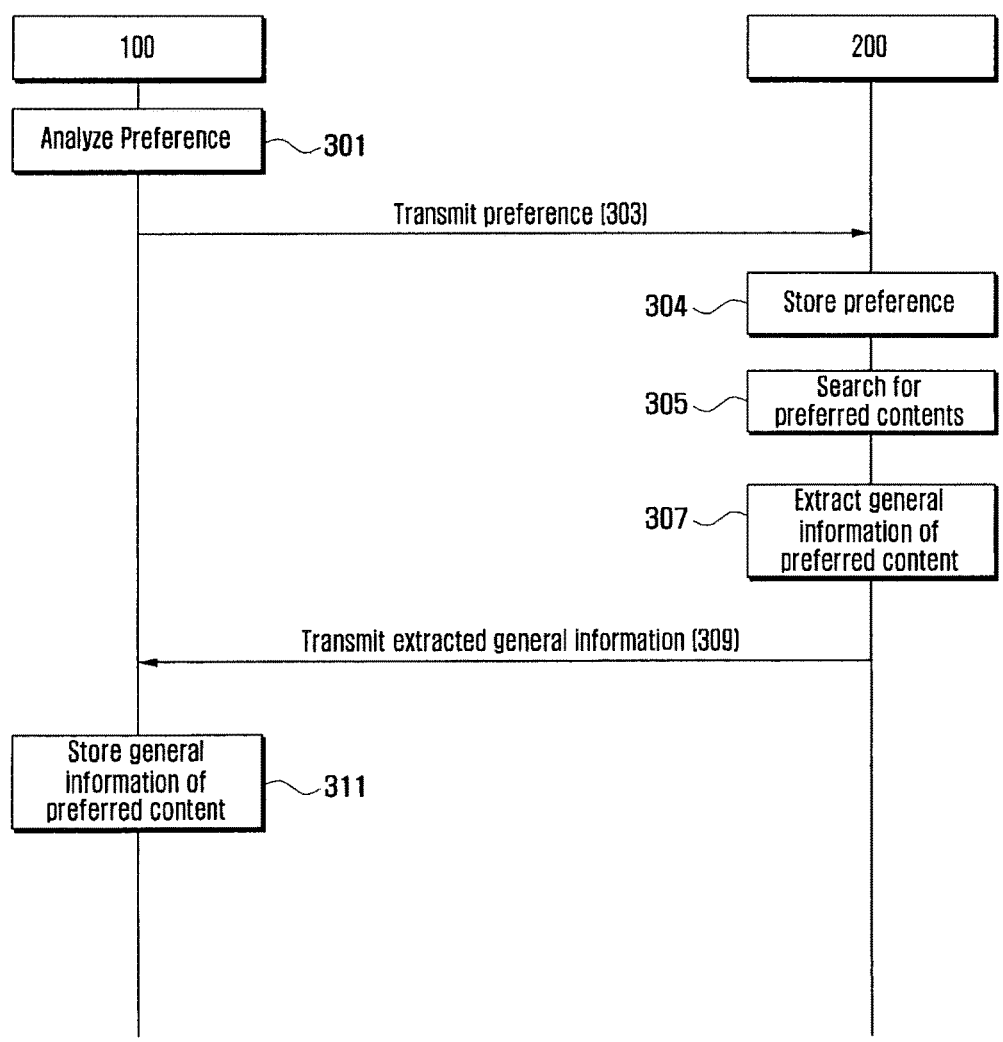
FIG. 3 illustrates a flow of a method of providing content according to an exemplary embodiment of the present invention.

FIG. 3 illustrates a flow of a method of providing contents based on preference according to an exemplary embodiment of the present invention.

Referring to FIGS. 1 to 3, a portable terminal 100 according to an exemplary embodiment of the present invention can analyze meta-data information of content stored on the portable terminal 100 to determine the user's preference(s) according to user's request (301). To this end, the portable terminal 100 can collect meta-data information of all content stored in storage unit 120 or collect meta-data information of content downloaded for a predetermined period of time, which may be set by the user, and analyze the collected meta-data information to determine the user's preference(s). For example, in case the content is an e-book, user's preference may be set as Category, and Author, etc. among meta-data information sets of the content. For example, Category may be classified as Music, Video, Images, Books, etc. The Book Category may then be further classified as Fiction and non-Fiction, wherein Fiction may be further divided into classes such as Science Fiction, Romance, Drama, Comedy, Suspense, etc. Similarly, non-Fiction may be further divided into classes such as Biographies, War, History, etc. Thus, assuming that the preference(s) are Category; BOOK and Author; AAA, then general information regarding a book written by author AAA would be provided to the user whereas general information regarding a song (Category Music) written by author AAA would not be provided. Similarly, if the preference(s) is Category; All and Subject Matter; AAA, then general information associated with books, music, motion pictures regarding author AAA may be provided to the user. The user may then refine the preference(s) by deleting all general information associated with music and motion pictures. Hence, general information only associated with Books of AAA may then be provided to the user. Note that a specific algorithm used to determine preference(s) from the metadata information is well known in the art.

The portable terminal 100 can transmit the determined preference(s) to content-providing server 200 (303). The content-providing server 200, after receiving the transmitted preference, can store the user's preference (304). Thereafter, the content-providing server 200 can search for a preferred content corresponding to the stored preference(s) (305). For example, in case the preference is set as Category and Author, the contents-providing server 200 can search for an e-book whose category and author match the stored preference(s).

The content-providing server 200 can extract general information of a content that satisfies the stored preference(s) criteria (i.e., preferred content) (307). The general information may include meta-data information, image information and link information of the preferred content. The image information may be, for example, the cover image (of an e-book, a music file, etc.). The link information may include a purchasing page link for purchasing the preferred content and a review page link that enables the user to view comments prepared by other users regarding the preferred content. The link may also allow the user to enter his/her own comments regarding the preferred content.

Next, the content-providing server 200 can transmit the extracted general information of the preferred content to portable terminal 100 (309). The content-providing server 200 can transmit general information of the preferred content upon a specific request by the user or during predetermined periods. The predetermined periods may be preset by the user or set automatically by one or more software timing programs. Or, the content-providing server 200 can transmit general information to portable terminal 100 every time a new content corresponding to the user's preference(s) is registered. The portable terminal 100, which receives the general information of the preferred content, may store the general information of the preferred content in a storage unit 120 (311).

Thereafter, though not illustrated in FIG. 3, the portable terminal 100 can display the general information associated with the preferred content on display unit 130 according to the user's request. The preferred content may then be downloaded and the user's preference(s) updated as is explained in more detail with reference to FIGS. 4 and 5.

Figure 4:
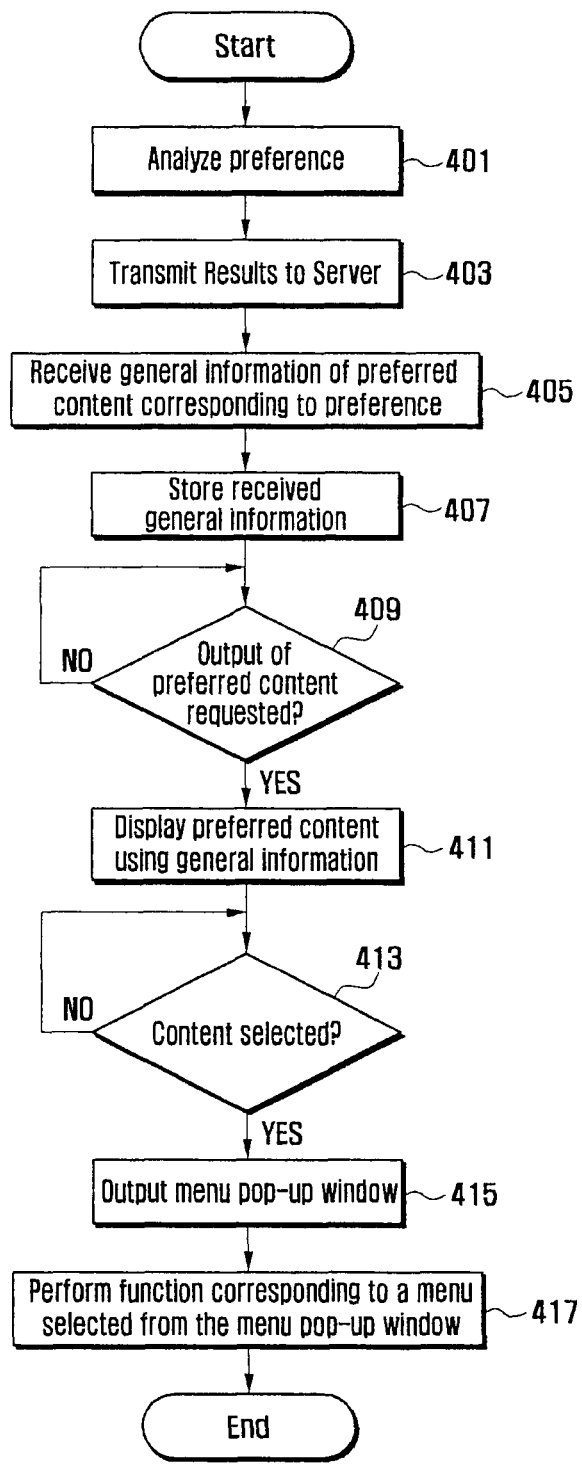
FIG. 4 is a flowchart illustrating a method of providing a content according to an exemplary embodiment of the present invention.
Figure 5:
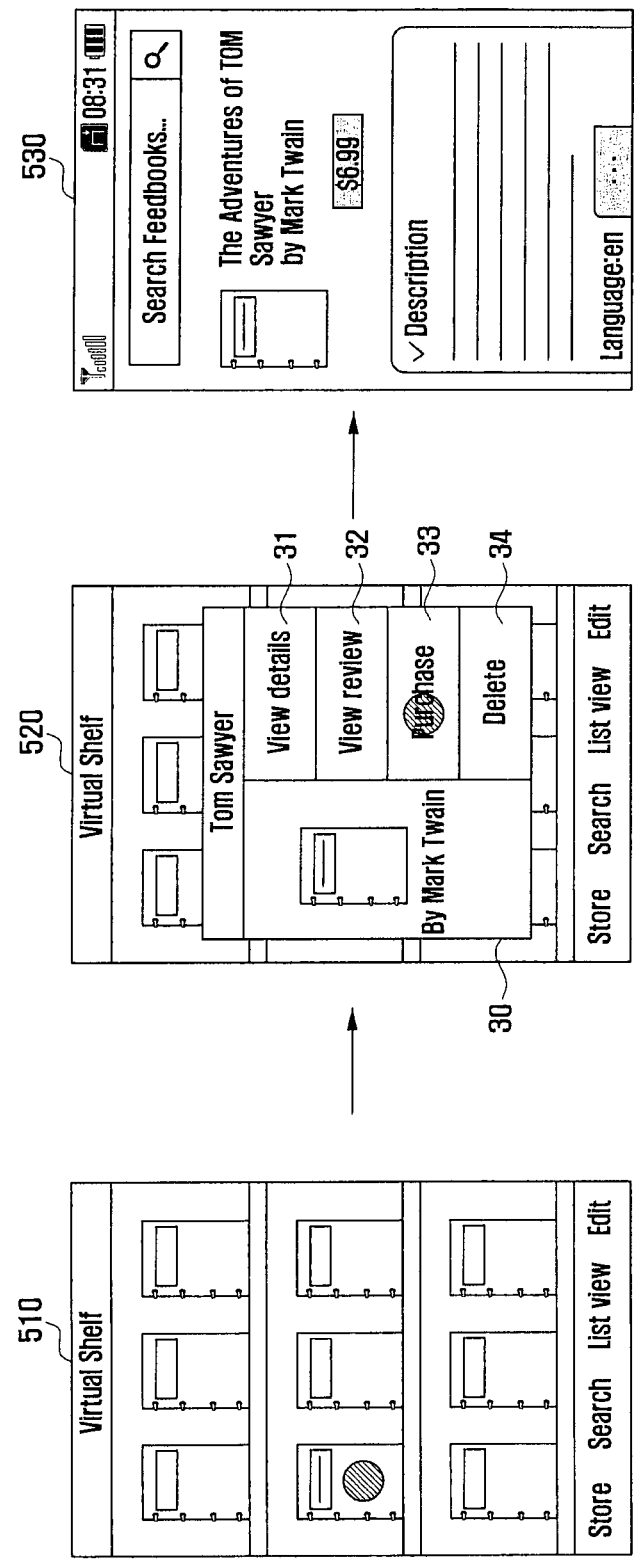
FIG. 5 illustrates a sequence of display screens in providing content according to an exemplary embodiment of the present invention.

FIG. 4 is a flowchart illustrating a method of providing content based on user's preference(s) according to an exemplary embodiment of the present invention. FIG. 5 illustrates exemplary screen display for providing content based on user preference(s) to an exemplary embodiment of the present invention.

Referring to FIGS. 1 to 5, controller 110 can analyze meta-data information regarding stored content (or user inputs) (401). To this end, the controller 110 may include a preference analysis engine 111. For example, the preference analysis engine 111 of the controller 110 can collect meta-data information of content stored in a storage unit 120 according to user's request (execution of a preference analysis function) or preference update period, or collect meta-data information of content that is downloaded during a predetermined period of time, and set a portion of the collected meta-data information of the stored content as user's preference. For example, Author, Category, Subject Matter, may be selected as user preferences categories from the meta-data information. In addition, within each category one or more sub-categories may be present. As would be appreciated, the categories and sub-categories may be preset by the manufacturer of the portable terminal 100 (or a vendor employed by the manufacturer) and may be modified by the user wherein some preset entries are deleted or added to.

The controller 110 can transmit the results of the analyzed user's preference(s) to the content-providing server 200 (403), receive general information of preferred content corresponding to the preference(s) from the content-providing server 200 (405), and store the received general information in the storage unit 120 (407). The general information may include meta-data information, image information and link information as described above. The controller 110 may inform the user of the reception of general information of the preferred contents using an audio processing unit 160, a display unit 130 and/or an oscillation motor (not shown), etc.

The controller 110 can check whether the display output of the general information associated with the preferred content is requested (409). If the display of general information associated with the preferred content is not requested, the controller 110 may remain at step 409.

However, if the display of the general information of the preferred content is requested, the controller 110 can display the general information of the preferred content using image information included in the general information (411). For example, in case the content is an e-book, the controller 110 can display the preferred content in the form of books arranged on a bookshelf using the cover image of the e-book as illustrated in the screen identified by reference numeral 510 of FIG. 5. The screen identified by reference numeral 510 illustrates an exemplary screen display wherein a plurality of images (in this case, 9) associated with general information associated with e-books are shown in rows on a bookshelf. The general information may represent general information of previously downloaded content in addition to the newly received general information. Although not explicitly shown, it would be understood that the images may be highlighted to show which of the images are most recently downloaded. For example, the images may be arranged in alphabetical order or may be arranged in time-order where the earliest alphabetical reference or the most recently downloaded images are displayed beginning in the upper left corner and extending to the right (for societies that read from left to right. In societies that read from right to left, the most recent images may be displayed in the upper right corner and older information extending to the left. Similarly, in Asian cultures, where reading is preformed vertically, then the older images may be displayed vertically from the most recent image, which may be displayed in the upper right or upper left corners). The screen identified by reference numeral 510 also illustrates specific function keys "Store," "Search," "List view," and "Edit." Each of these function keys may perform a desired operation on one or more selected images. Also shown in the screen associated with reference numeral 510 is a hash circle. The hash circle is used, herein, to indicate a selection of a particular image, for further processing as will be described.

The controller 110 can check whether any one of the displayed preferred contents (cover image) is selected (413) (hash circle). If the preferred content is not selected, the controller may remain at step 413.

However, if content is selected, the controller 110 can output a menu pop-up window 30, as illustrated in the screen identified by reference numeral 520 of FIG. 5 (415). The menu pop-up window 30 may include a detailed-information-viewing menu 31, a review-viewing menu 32, a purchasing menu 33 and a deleting menu 34. Although, these four menu selections are discussed, it would be understood that these menus are only for the purpose of describing the invention claimed and that the number and content of the menu items may be altered without altering the scope of the invention. As would be recognized, the entries of the pop-up window menu may present additional operational functions that a user may select. In some case, a selected operational function may act directed on the corresponding information (e.g., delete). In other cases, the selected operational function may cause the display of another page that requires further information (e.g., purchase).

With reference to the screen identified by reference numeral 520, the pop-up window includes a subject matter "Tom Sawyer" and identifies the author as Mark Twain. In this case, with the selection of the book on the second shelf (screen 510), the general information of the selected book are shown in screen 520. Although, not explicitly shown, the book images shown in screen 510 may represent books that are associated with Author: Mark Twain or may be books associated with Subject Matter: Tom Sawyer or may be books associated with Category: Fiction. As would be appreciated, the Category: Fiction may include further sub-categories, such as American, Period, etc.

The controller 110 can perform a function corresponding to the menu item selected in the menu pop-up window 30 (417). For example, if the purchasing menu 33 is selected (indicated by hash circle), the controller 110 can output a purchasing page for purchasing a content as shown the screen identified by reference numeral 530 of FIG. 5. Further, though not illustrated, the controller 110 can output a detailed information screen or a review screen corresponding to the selection of the detailed-information-viewing menu 31 or the review-viewing menu 32. Further, if the Delete menu 34 is selected, the controller 110 can delete the corresponding general information from the storage unit 120, update the user's preference based on the deletion, and transmit updated user's reference to the content-providing server 200.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art fall within the spirit and scope of the present invention, as defined in the appended claims.

What is claimed is:

1. A method for providing at least one content based on at least one preference of a user operating a portable terminal, the method comprising:
   receiving an input designating a time period to select at least one content that was previously stored to the portable terminal within the time period;
   analyzing meta-data information of the at least one content;
   determining the at least one preference based on the analyzed meta-data information;
   transmitting the determined at least one preference to a content-providing server;
   receiving general information associated with at least one content corresponding to the at least one preference from the content-providing server;
   in response to a selection of the general information associated with the at least one content, displaying a deleting menu;
   in response to a selection of the deleting menu, updating the at least one preference when at least one of the received general information is deleted; and
   transmitting the updated at least one preference to the content-providing server.

2. The method of claim 1, wherein the general information includes at least one of: image information, link information including a purchasing page link and a review page link, and meta-data information of the at least one content searched based on the at least one preference.

3. The method of claim 1, wherein the general information is received in a push method.

4. The method of claim 1, wherein the general information is received when a new content corresponding to the at least one preference is registered on the content-providing server.

5. The method of claim 2, further comprising:
displaying the general information of the at least one content corresponding to the at least one preference using associated image information;
displaying a menu pop-up window when one of the displayed general information is selected, the menu pop-up window including at least one entry associated with a corresponding operational function; and
detecting selection of one of the at least one entry in the menu pop-up window; and
displaying a specific page corresponding to the operational function.

6. The method of claim 1, wherein analyzing the meta-data information comprises at least one of:
collecting meta-data information of at least one content that is downloaded for the time period, and stored on the portable terminal; and
collecting meta-data information of at least one content that is purchased for the time period, and stored on the portable terminal.

7. A method for providing at least one content based on at least one preference of a user operating a portable terminal, the method comprising:
receiving at least one preference from the portable terminal;
searching for the at least one content based on the at least one preference;
extracting general information of the at least one content searched based on the at least one preference; and
transmitting the extracted general information to the portable terminal,
wherein the general information comprises link information including a purchasing page link and a review page link of the at least one content searched based on the at least one preference, and wherein the purchasing page link and the review page link are associated with corresponding menu items displayed on a display of the portable terminal.

8. The method of claim 7, wherein the at least one preference is determined by analyzing meta-data information of at least one content that was previously stored to the portable terminal within a time period, and updated when at least one of the extracted general information is deleted.

9. The method of claim 7, wherein the general information further comprises at least one of image information and meta-data information of the at least one content searched based on the at least one preference.

10. The method of claim 7, wherein the general information is transmitted using a push method.

11. The method of claim 7, wherein the general information is transmitted when a new content based on the at least one preference is registered on a content-providing server.

12. A portable terminal comprises:
a storage unit that stores at least one content;
an input unit that receives an input designating a time period to select at least one content that was previously stored to the portable terminal within the time period;
a controller including:
a preference analysis engine for:
analyzing meta-data information of the at least one content; and
determining at least one preference based on the analyzed meta-data information;
a wireless communicator configured to transmit the at least one preference to a content-providing server, and receive general information associated with at least one content corresponding to the at least one preference from the content-providing server; and
a display unit configured to display at least one element of the received general information,
wherein the controller is configured to:
in response to a selection of the at least one element of the received general information, control the display unit to display a deleting menu;
in response to a selection of the deleting menu, update, when at least one of the received general information is deleted, the at least one preference; and
transmit the updated at least one preference to the content-providing server.

13. The portable terminal of claim 12, wherein the controller causes the display unit to:
display a menu pop-up window when at least one element of the general information displayed in the display unit is selected, the menu pop-up window including entries associated with corresponding operational functions; and
display a page corresponding to a selected entry, wherein the page includes information regarding the corresponding operational functions.

14. The portable terminal of claim 12, wherein the display unit is configured to display an indicator in response to reception of the general information.

15. The portable terminal of claim 12, further comprising:
an audio processor configured to output an effect sound in response to reception of the general information.

16. The portable terminal of claim 12, wherein the controller:
associates each of a plurality of meta-data information associated with the content stored in the storage unit and available to the controller to at least one of a plurality of categories;
determines a number of meta-data information in each of the categories; and
selects at least one of the categories as the at least one preference, wherein the selection is one of: a largest number within a category and a number within a category being greater than a threshold value.

17. The portable terminal of claim 12, wherein the general information includes at least one of: image information, link information including a purchasing page link and a review page link, and meta-data information of the at least one content searched based on the at least one preference.

* * * * *